United States Patent
Gurley

(10) Patent No.: US 10,174,745 B2
(45) Date of Patent: Jan. 8, 2019

(54) BRAIDED SHAPE MEMORY ACTUATOR

(71) Applicant: Austin Russell Gurley, Leeds, AL (US)

(72) Inventor: Austin Russell Gurley, Leeds, AL (US)

( * ) Notice: Subject to any disclaimer, the term of this patent is extended or adjusted under 35 U.S.C. 154(b) by 100 days.

(21) Appl. No.: 15/462,828

(22) Filed: Mar. 18, 2017

(65) Prior Publication Data

US 2018/0266400 A1    Sep. 20, 2018

(51) Int. Cl.
| | |
|---|---|
| *F03G 7/06* | (2006.01) |
| *B25J 18/06* | (2006.01) |
| *H02P 31/00* | (2006.01) |
| *G05B 21/00* | (2006.01) |

(52) U.S. Cl.
CPC .......... *F03G 7/065* (2013.01); *G05B 21/00* (2013.01); *H02P 31/00* (2013.01)

(58) Field of Classification Search
CPC ..... F02G 1/00; F02G 1/04; F03G 7/00; F03G 7/06; F03G 7/065; F01B 29/10; B25J 9/00; B25J 9/10; B25J 9/1085; B25J 18/00; B25J 18/06; B25J 18/02; B25J 18/025; F16F 15/00; F16F 15/005; F16F 3/04; H01H 61/00; H01H 61/01; H01H 61/0107

See application file for complete search history.

(56) References Cited

U.S. PATENT DOCUMENTS

| | | | | | |
|---|---|---|---|---|---|
| 4,490,975 | A | * | 1/1985 | Yaeger | H01H 61/0107 337/140 |
| 4,553,393 | A | * | 11/1985 | Ruoff | F16F 3/04 337/140 |
| 4,586,335 | A | * | 5/1986 | Hosoda | B25J 18/025 294/86.4 |
| 5,727,391 | A | * | 3/1998 | Hayward | B25J 9/1085 248/636 |
| 5,763,979 | A | * | 6/1998 | Mukherjee | F03G 7/065 310/306 |
| 7,256,518 | B2 | * | 8/2007 | Gummin | F03G 7/065 310/12.33 |
| 8,607,562 | B2 | * | 12/2013 | Browne | F03G 7/065 60/527 |
| 2013/0199172 | A1 | * | 8/2013 | Strom | F03G 7/065 60/527 |
| 2015/0152852 | A1 | * | 6/2015 | Li | H02N 11/006 60/528 |

* cited by examiner

*Primary Examiner* — Tran Nguyen

(57) ABSTRACT

One embodiment of an electro-mechanical actuator, comprised of a braid (1) of insulated wires of shape memory material, trained to a contracted length, connected at the ends to primary fixture (2) and secondary fixture (3). These fixtures guide the electrical path through the braid from the electrical power source (4), in a winding path through the braid (5-10), and to electrical ground (11). Other embodiments are described and shown.

10 Claims, 3 Drawing Sheets

(Fig 3)

BRAIDED SHAPE MEMORY ACTUATOR

CROSS-REFERENCE TO RELATED APPLICATIONS

The present application claims the benefit of Provisional Patent Application Ser. No. 62/310,726, filed 20 Mar. 2016 by the present inventor, which is incorporated by reference.

BACKGROUND

This application relates to electro-mechanical actuators, particularly to an actuator formed from braided shape memory materials which provides an increased electrical resistance such that it is easier to actuate electrically.

Shape memory alloys (SMAs) and shape memory polymers (SMPs) have many unique material properties that allow them to be used as actuators. These properties include simplicity, low cost, high energy/weight ratio, and near silent operation of motion. Conventional SMA actuators, such as Nickel-Titanium NiTi, are simple straight wires that contract with large force when heated and relax when cooled and stressed—this is called the 'shape memory effect' [U.S. Pat. No. 3,463,238]. Using known alloys, actuators can be designed that are capable of exhibiting this motion many thousands of times without exhaustion when heated and cooled. Many shape memory materials have sufficient electrical resistivity that SMA wires can be heated by passing electric current through them, making them effective actuators.

Unfortunately the strain of a straight SMA wire is on the order of only 5%—this is very small compared to typical actuation needs; strains of ~50% are more useful in most applications. One common technique to increase the strain of an SMA actuator is to form it into a coil-spring [U.S. Pat. No. 4,490,975, U.S. Pat. No. 4,586,335, U.S. Pat. No. 8,607,562, US2015/0073318]. The coil spring is formed by, for instance, winding a straight wire in a spiral around a mandrel, clamping against the mandrel, heat-treating in a furnace at high temperatures (350 to 600 C), and quenching in water. Subsequently the wire will retain the shape it was held in during heat-treatment—called the 'memory' shape. It will be easily deformed when cold, but will return to the memorized shape when subsequently heated. Because the material in such a coil-spring has primarily internal shear deformation, the extension and contraction of the device, when heated and cooled, can be as much as 300% of the device length. However, the strength of SMA coil-spring actuators is very small compared to that of the straight wires—large strain is achieved but the actuator stress capability is greatly diminished. It is often necessary to place multiple springs in parallel to achieve useful actuator strength, though this increases the size and complexity of the actuator [U.S. Pat. No. 4,553,393]. A problem with small coil-springs is that they are fragile and can be easily kinked or crushed during use.

Braiding is a textile formation process that involves the interlacing of three or more yarns. Typically braids are formed using a Maypole Braiding Machine which creates a tubular braid. The braided tube is often formed over a mandrel—an internal form that determines the final inner dimensions of the part.

Braids of shape memory materials, trained to remember a tubular form, have been used as medical stents which expand once upon warming into a super-elastic state [U.S. Pat. No. 3,868,956].

Electrically insulating coatings have been designed that can accommodate the large material strain of shape memory materials without cracking. Insulating methods in the literature include coating the surface of the wires with an insulating material such as Polytetrafluoroethylene or polyether-ether-ketone [Sheiko et al, Applied Surface Science 289 (2016) 651-665], and by intentional oxidation of the surface [U.S. Pat. No. 6,410,886].

SUMMARY

By forming SMA wires into a braid and training it to memorize a compact braid shape, an actuator is created that improves on the capability of the simple coil-spring. Each filament in the braided actuator behaves like a coil-spring but the braid contains multiple wires in parallel—directly increasing the strength of the muscle proportional to the number of filaments braided. The braid is also self-healing when heated after being crushed. It also cannot kink as easily as a similar size coil-spring might.

The multiple wires in series in the braid increase the strength of the muscle, but decrease the electrical resistance if current is passed directly from one end of the actuator to the other through all wires simultaneously. Lower resistivity makes electrical heating more difficult for common electrical circuits as it requires higher current to achieve the same power than a high resistance device.

To increase the electrical resistance of the braided SMA muscle, this invention provides an electrical path that runs back-and-forth through the braid in a winding pattern; the electrical path is longer than the physical length of the actuator and has a higher electrical resistance so it is easier to heat. The electrical path can initiate and terminate on the same end of the actuator for easy connection to the driving electric power source. To ensure the electric current follows the desired path through this device, the wires must be insulated—otherwise they would short-circuit where they overlap and touch within the braid. Electrical insulation can be achieved by many methods such as coating the surface of the wires with an insulating material, by intentional oxidation of the surface, by covering with an insulating jacket, or by otherwise coating or plating the braid. These insulations may be applied to the wires before braiding if they can resist high temperature, or applied to the entire braid after heat-treatment, as required to ensure they insulate the wires in the braid from each other.

Another benefit of this braided actuator is that it can be heat-treated (or otherwise trained) to remember a short or long form. If it is trained to a short form and subsequently stretched, it will contract to a short form when heated, creating a large tensile force. If it is trained to a long form and subsequently compacted, it will expand to a short form when heated, creating a large expansion force. Several braids can be placed in parallel to increase the force achieved.

These braids in parallel can be arranged concentrically to occupy as little space as possible. Also, multiple braids can be trained to have different lengths—by operating two braids mechanically parallel to each-other, the device could be made to selectively extend or contract by heating one of the two braids. These braids could also be arranged concentrically to preserve space within the device. Similarly, the circuit could be modified so that not all yarns are heated simultaneously which would reduce the force while decreasing the electrical power consumed. The circuit could allow that only a single wire or a few selected wires in the braid is heated by each source of power—thus reducing power consumption and actuation force.

Because this braid can be formed using conventional manufacturing techniques, it will be easily seen that such a braided actuator can be formed with few or many wires (for instance 8, 16, 32, 48, etc.). This allows the actuator to be designed for a specific application based on the desired actuation force and the power required to heat it. It can be formed from many sizes of wires, or from flat ribbons or other filaments. This invention can have braids of any cross-sections that are circular, triangular, square, or other convex shapes as desired. It can also have a circumference that varies along the length of the braid. The figures demonstrate a simple circular braid of eight wires.

To guide the electrical path through the braid, it is useful to attach the braid between fixtures such as printed circuit boards that hold the paired ends of the braided wires, and allow external electrical connections to be made. These boards also act to prevent tangling and crushing of the end of the braid and allow mechanical connection to external devices. The figures demonstrate a braid soldered into place in the fixtures. It is obvious that the soldering could be replaced by other fastening means such as crimping, welding, or bonding.

DRAWINGS—FIGURES

Figures 1A, 1B:
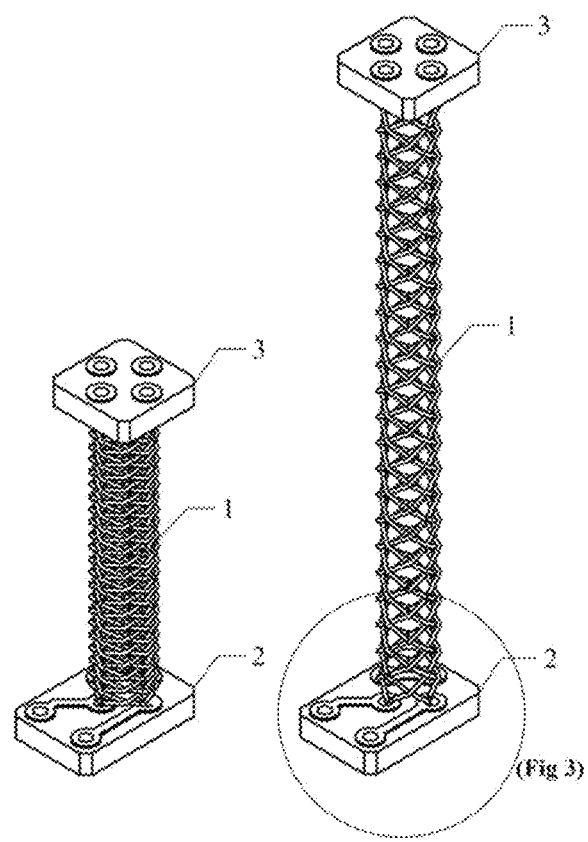
FIGS. 1A and 1B show the complete braided actuator in contracted and extended states, respectively.
Figure 3:
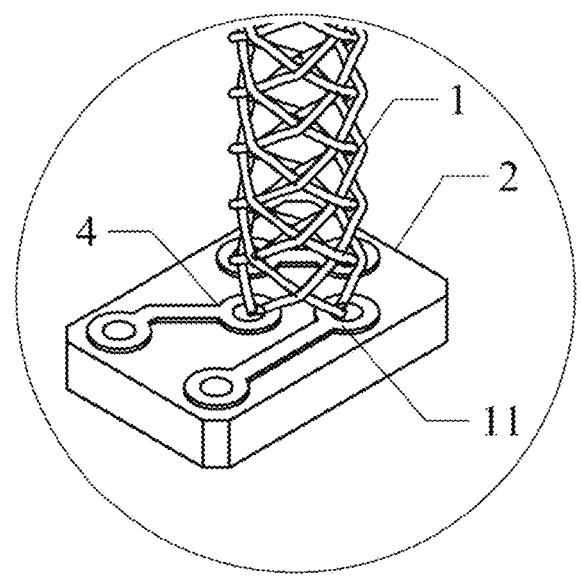

FIG. 3 provides a detailed view of the FIG. 1A, showing the attachment between the braid and a fixture where pairs of braided fibers are connected in their matching holes.

Figure 4:
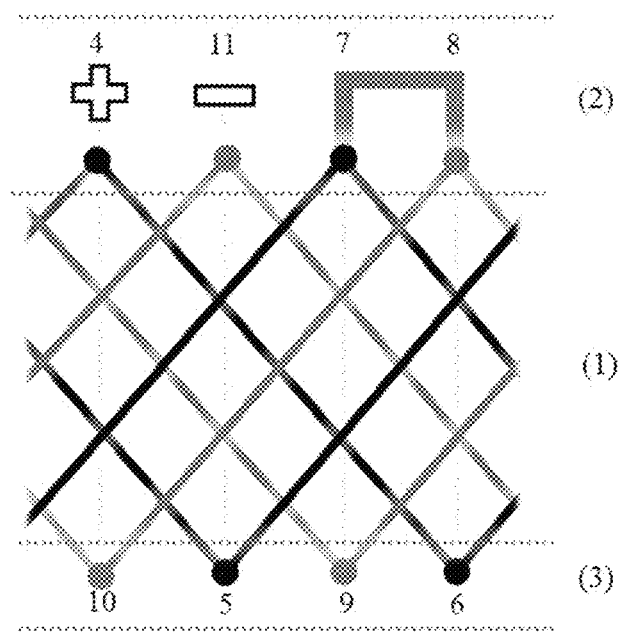

FIG. 4 is a diagram that demonstrates the path of electric current through the actuator.

Figure 5:
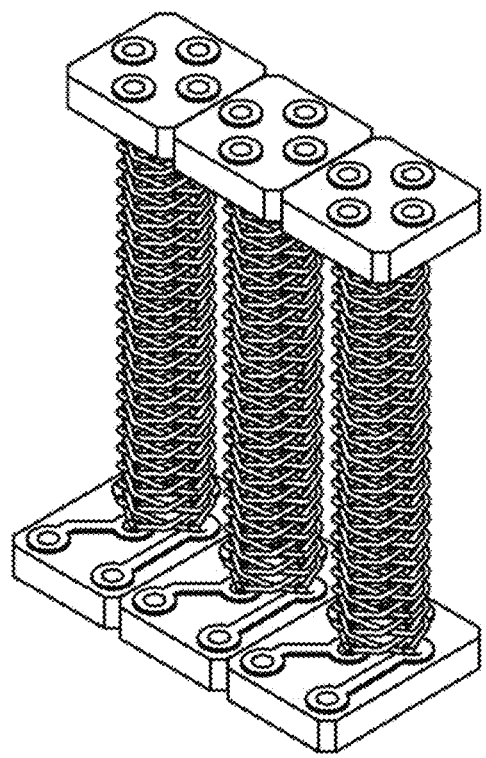

FIG. 5 shows an embodiment with multiple actuators acting in parallel to increase the total strength.

Figure 6:
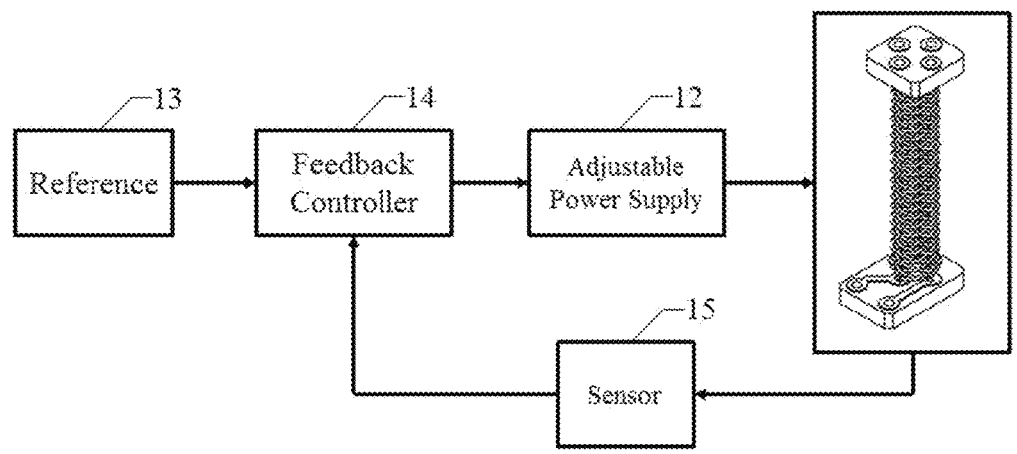

FIG. 6 demonstrates the actuator being controlled by a feedback control system.

DRAWINGS—REFERENCE NUMERALS 1 braid
2 primary fixture
3 secondary fixture
4 first connection
5 second connection
6 third connection
7 fourth connection
8 fifth connection
9 sixth connection
10 seventh connection
11 eighth connection
12 power supply
13 reference state
14 feedback control system
15 sensor

DETAILED DESCRIPTION

Looking now to the figures, the completed device is shown in FIG. 1.

A braid 1 made from a shape memory material and insulated covering is connected between primary fixture 2 and secondary fixture 3. This braid is formed such that it is very compact and with low pitch when hot (FIG. 1A). The braid can be extended to a long shape by cooling and/or applying axial tension (FIG. 1B). Alternatively, the braid could be formed to have a long shape when hot (FIG. 1B) and be shortened when cooled and compressed (FIG. 1A). Each end of the device is connected into a primary fixture 2 and secondary fixture 3.

Figure 2:
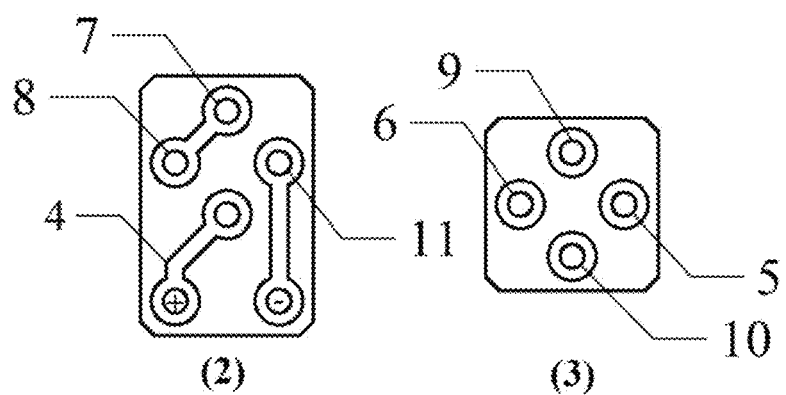
FIG. 2 shows the fixtures that bind the end of the braid and guide electrical currents.

Looking now to FIG. 2, the primary fixture 2 and secondary fixture 3 are shown in detail. Primary fixture 2 has circumferential holes where the braid is to be connected. Said primary fixture 2 provides: first connection 4 between the braid and the power source, fourth connection 7 and fifth connection 8 between the braided wires, and eighth connection 11 between the braid and electrical ground. Secondary fixture 3 has four holes where the opposite ends of the braid 1 are connected, forming second connection 5, third connection 6, sixth connection 9, and seventh connection 10.

Looking now to FIG. 3, another view of primary fixture 2 is shown with braid 1 in place. The ends of said braid 1 are paired where they overlap and soldered together into their matching connections (4-11).

Looking now to FIG. 4, a diagram is provided showing the electrical path through the braid 1. FIG. 4 represents the interlacing of the braid 1 as if it was unrolled from the tubular form shown. There are two electrical paths through the device—one that begins clockwise from first connection 4, and one that begins counter-clockwise from the same. These paths wind through the braid and meet other wires at second connection 5 and third connection 6 on secondary fixture 3. The electrical path then reverses, terminating together at fourth connection 7 on primary fixture 2. Between fourth connection 7 and fifth connection 8, a direct connection is provided on the primary fixture 2. From fifth connection 8, the electrical path again splits into two paths that terminate at sixth connection 9 and seventh connection 10 on secondary fixture 3. Finally, the electrical paths return to converge at eighth connection 11 on primary fixture 2.

In operation, this device is attached between two bodies between which one desires to generate a motive force. The primary fixture 2 and secondary fixture 3 are fastened to the bodies directly. In order to generate a force to pull the bodies together, electric current is passed from first connection 4, though the device, and out from eighth connection 11. This electric current heats the braid above ambient temperature, causing the shape memory effect to initiate and the braid to create a tensile force between the bodies. The magnitude of the force can be controlled by limiting the voltage or current used. When the electric current is halted, the actuator will cool and relax the tension between the bodies. This operation can occur many times—apply and releasing the tensile force as the operator desires.

Looking now to FIG. 5, a set is formed from a plurality of braided actuator assemblies placed mechanically in parallel. In operation, these braided actuator assemblies can be actuated in the same direction simultaneously to increase actuation force. Alternately, they could be trained to strain toward different lengths, and by selectively heating a chosen braided actuator assembly in the set, the entire set would be driven to a different length.

Looking now to FIG. 6, the braided actuator is placed in a feedback control system. A reference 13 for desired position or force is provided to a feedback control system 14. A sensor 15 measures the position or force of the braided actuator, and provides the measurement to said feedback control system. The feedback control system then adjusts a power supply 12 which is connected to the electrical path of the braided actuator, as to minimize the error between the sensor 15 and the reference 13.

CONCLUSION AND RAMIFICATIONS

Thus, the reader will see that this actuator provides an electrical path which provides high strain from shape memory materials by using a braid rather than straight wire, yet is more easily driven by electrical power sources that can sustain high voltage but cannot drive high current. By increasing the resistance of the electrical path, the actuator is more easily heated.

I claim:

1. An actuator comprising:
   a. A plurality of yarns formed from a shape memory material, said material returning to a predetermined shape when electric current is passed through it,
   b. A braid formed from said yarns trained to contract or extend when said electric current is passed through said yarns,
   c. means for electrically insulating said yarns such that contact between any adjacent of said yarns in said braid cannot conduct electricity, and
   d. fixtures on each end of said braid providing electrical connections to an external electrical power source, mechanical interconnection to the ends of said braid, and electrical interconnections to provide an extended electrical path through said yarns in said braid, said extended electrical path longer than the length of any of said yarns, such that the total electrical resistance of said extended electrical path is greater than the electrical resistance of said yarns conducting electrically in parallel.

2. The actuator of claim 1, wherein alternate said extended electrical paths are provided such that electric current passed through any of said alternate electrical paths interconnects fewer than a total quantity of said yarns.

3. The actuator of claim 1, wherein said extended electrical path has said electrical connections to said external electrical power source on the same end of the braid.

4. The actuator of claim 1, further comprising a plurality of said braids and said extended electrical paths, arranged mechanically in parallel to provide increased actuation force.

5. The actuator of claim 4, wherein any of said braids are trained to contract, while others of said plurality of said braids are trained to extend, such that electric current passed through any of said extended electrical paths can be used to alternately extend or contract said actuator.

6. The actuator of claim 1, further comprising a feedback control system that adjusts an output of said external electrical power source, such that said feedback control system controls said actuator to track a predetermined motion or force trajectory.

7. The actuator of claim 6, further comprising a sensor to measure the force or length of said actuator, said feedback control system reading said sensor and adjusting the output of said external electrical power source, such that said actuator tracks a predetermined force or position trajectory.

8. A method for creating motion using shape memory material, comprising:
   a. providing a plurality of yarns formed from said shape memory material which return to a predetermined shape when electric current is passed through it,
   b. forming said yarns into a braid trained to contract or extend when said electric current is passed through said yarns,
   d. insulating said yarns in said braid such that contact between any adjacent of said yarns in said braid cannot conduct electricity, and
   e. connecting ends of said braid in a manner to create an extended electrical path so that a total electrical resistance of said extended electrical path is greater than the electrical resistance of said plurality of yarns conducting electrically in parallel, thereby said actuator can be actuated, in a facilitating manner, with electric current due to the increased electrical resistance.

9. The method of claim 8, further providing an adjustable electrical power supply to drive electric current through said extended electrical path.

10. The method of claim 9, further providing a force or position sensor, and adjusting said power supply such that said actuator tracks a predetermined force or position trajectory.

* * * * *